United States Patent [19]

Ishikawa

[11] Patent Number: 5,537,152
[45] Date of Patent: Jul. 16, 1996

[54] TELEVISION RECEIVER FOR DISPLAYING REGISTERED BROADCAST CHANNELS IN DISPLAY SEGEMENTS AND A CHANNEL SELECTOR HAVING SIMILAR SEGMENTS

[75] Inventor: Yoji Ishikawa, Tokyo, Japan

[73] Assignee: Sony Corporation, Tokyo, Japan

[21] Appl. No.: 502,265

[22] Filed: Jul. 13, 1995

Related U.S. Application Data

[63] Continuation of Ser. No. 245,059, May 17, 1994, abandoned, which is a continuation of Ser. No. 985,090, Dec. 2, 1992, abandoned.

[30] Foreign Application Priority Data

Dec. 2, 1991 [JP] Japan .................. 3-341813

[51] Int. Cl.⁶ ........................................ H04N 5/44
[52] U.S. Cl. .................. 348/564; 348/569; 348/734
[58] Field of Search ..................... ; 348/563, 570, 348/734; H04N 5/44, 5/445

[56] References Cited

U.S. PATENT DOCUMENTS

| | | | |
|---|---|---|---|
| 4,774,582 | 9/1988 | Hakamada et al. | 358/183 |
| 5,031,046 | 7/1991 | Brüggermann | 358/194.1 |
| 5,040,067 | 8/1991 | Yamazaki | 358/183 |
| 5,093,726 | 3/1992 | Chun | 358/183 |
| 5,157,496 | 10/1992 | Kurosawa | 358/194.1 |
| 5,161,019 | 11/1992 | Emanuel | 358/183 |

FOREIGN PATENT DOCUMENTS

0179671  7/1988  Japan .................. H04N 5/45

*Primary Examiner*—Victor R. Kostak
*Assistant Examiner*—Nathan J. Flynn
*Attorney, Agent, or Firm*—Jay H. Maioli

[57] ABSTRACT

A television receiver with a function of displaying a plurality of pictures on segmental screens, wherein pictures of registered broadcasting stations are sequentially displayed on the segmental screens in such an arrangement that actuating members in a channel selector are positioned correspondingly to the segmental picture screens, and in response to manipulation of one of the actuating members, the broadcasting station corresponding thereto is selected out of the stations being displayed in the segmental picture screens. In this television receiver, the channel selector consists of a remote control unit, and the actuating members disposed in the channel selector consist of buttons to be depressed. In the constitution mentioned, it is possible to select any desired broadcasting station with facility by a simplified manipulation while confirming the display contents of the stations instantaneously.

2 Claims, 6 Drawing Sheets

TELEVISION RECEIVER FOR DISPLAYING REGISTERED BROADCAST CHANNELS IN DISPLAY SEGEMENTS AND A CHANNEL SELECTOR HAVING SIMILAR SEGMENTS

This is a continuation of application Ser. No. 08/245,059, filed May 17, 1994, now abandoned, which is a continuation of application Ser. No. 07/985,090, filed Dec. 2, 1992, now abandoned.

BACKGROUND OF THE INVENTION

1. Field of the Invention

The present invention relates to improvements in a television receiver and a channel selector thereof.

2. Description of the Prior Art

Figure 9:
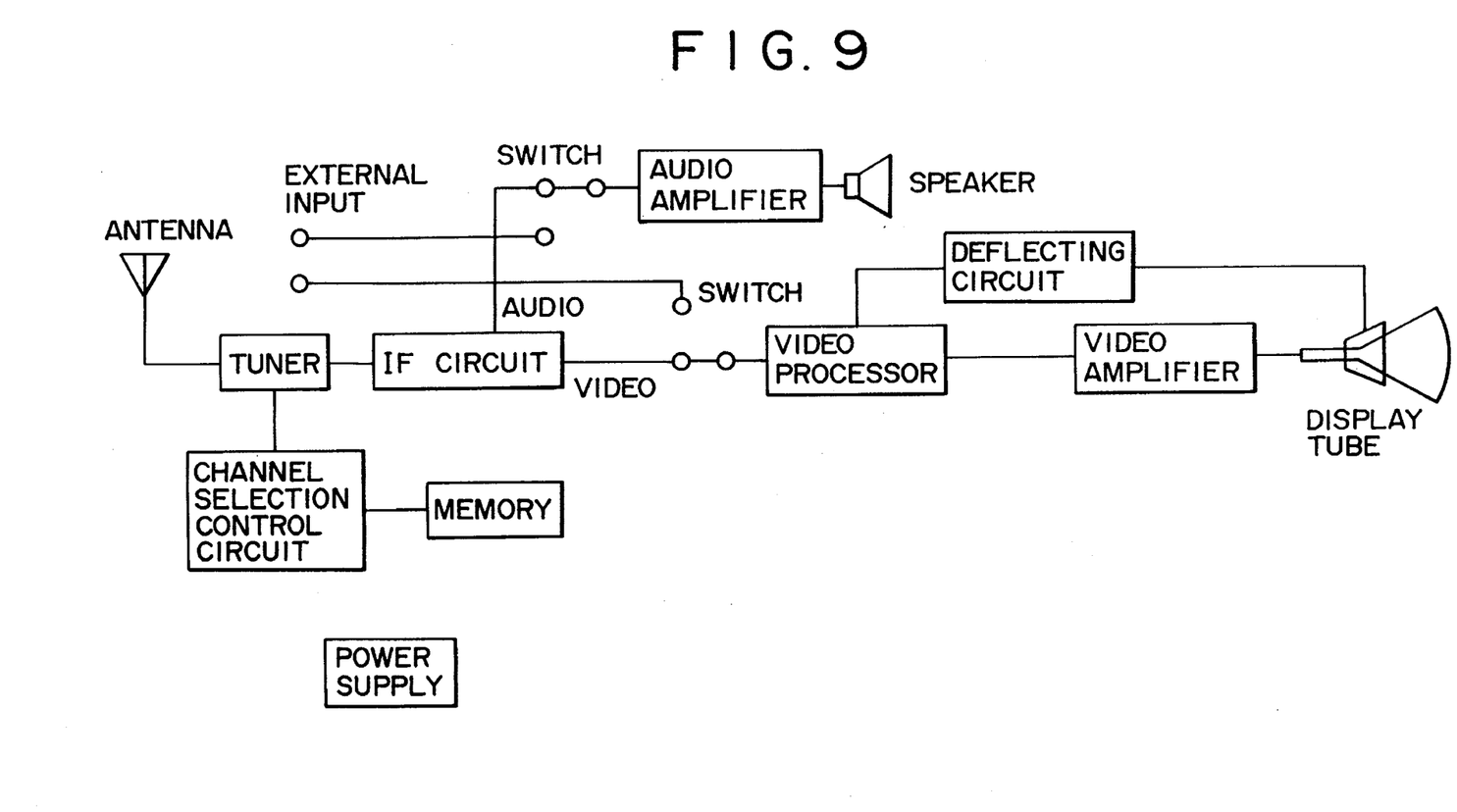
FIG. 9 is a block diagram of a conventional television receiver.

FIG. 9 is a block diagram of a general circuit configuration in a conventional television receiver. In such known television receiver, there are adopted the following three systems for selection of a desired broadcasting station.

(a) A selection system by depressing, out of plural actuating buttons disposed in a remote control unit as a channel selector or a television receiver itself, plural digits of the channel number of a desired station;

(b) A selection system by previously registering stations corresponding in number to actuating buttons and depressing a predetermined appropriate button for a desired station;

(c) A selection system by sequentially shifting registered stations through the use of a button which is equipped with a function to change a channel up or down in the order of station selection.

However, the required manipulation to be performed is complicated in any of the known systems mentioned, and there exists a disadvantage that the number of registerable broadcasting stations is limited to the number of buttons.

In addition, there arises a problem with respect to the operational facility that the operator needs to memorize the positional relation between the registered stations and the buttons corresponding thereto.

Furthermore, it is impossible to confirm the content of each broadcast prior to display of the same on a screen by the manipulation for channel selection.

OBJECT AND SUMMARY OF THE INVENTION

The present invention has been accomplished in view of the problems mentioned. And it is an object of the invention to provide improvements in a television receiver and a channel selector thereof which enable an operator to select a desired broadcasting station after visually confirming the broadcast content instantaneously by a simplified manipulation to consequently achieve remarkable enhancement in the operational facility. According to one aspect of the present invention, there is provided a television receiver with a function of displaying a plurality of pictures on segmental screens, wherein pictures of registered broadcasting stations are sequentially displayed on the segmental screens in such an arrangement that actuating members in a channel selector are positioned correspondingly to the segmental picture screens, and in response to manipulation of one of the actuating members, the broadcasting station corresponding thereto is selected out of the stations being displayed in the segmental picture screens.

According to another aspect of the present invention, there is provided a television receiver wherein a channel selector has a plurality of actuating members disposed at predetermined positions corresponding to those of segmental picture screens so as to select broadcast stations, and when the actuating member at a desired position is manipulated, the broadcasting station on one segmental picture screen at the position corresponding to the manipulated actuating member is selected out of the entire stations being displayed, and the selected picture is displayed on the whole screen.

In the television receiver mentioned, the channel selector consists of a remote control unit, and the actuating members disposed therein consist of buttons to be depressed.

Since the television receiver of the present invention is adapted for display on segmental screens, it is possible to simultaneously display, in the segmental areas of one whole screen, a plurality of pictures of broadcasting stations to be selected, or a main picture and one or more pictures to be selected.

Furthermore, pictures of plural broadcasting stations to be selected are sequentially displayed on the segmental screens under such condition that the display sequence positionally corresponds to the actuating members of the channel selector.

Therefore it becomes possible for the operator to select a desired station with facility by visually confirming the displayed stations on the segmental screen areas and then manipulating the appropriate actuating member of the remote-control channel selector in conformity with the position of the desired station on the screen.

The above and other features and advantages of the present invention will become apparent from the following description which will be given with reference to the illustrative accompanying drawings.

DESCRIPTION OF THE PREFERRED EMBODIMENTS

Hereinafter exemplary embodiments of the present invention will be described in detail with reference to FIGS. 1 through 8.

Since the embodiments described below are preferred specific examples of the present invention, a variety of technically preferable definitions are affixed thereto. However, it is to be understood that the scope of the present invention is not limited to such examples alone unless any particular description is given with regard to limitation of the invention in the following explanation.

Figure 1:
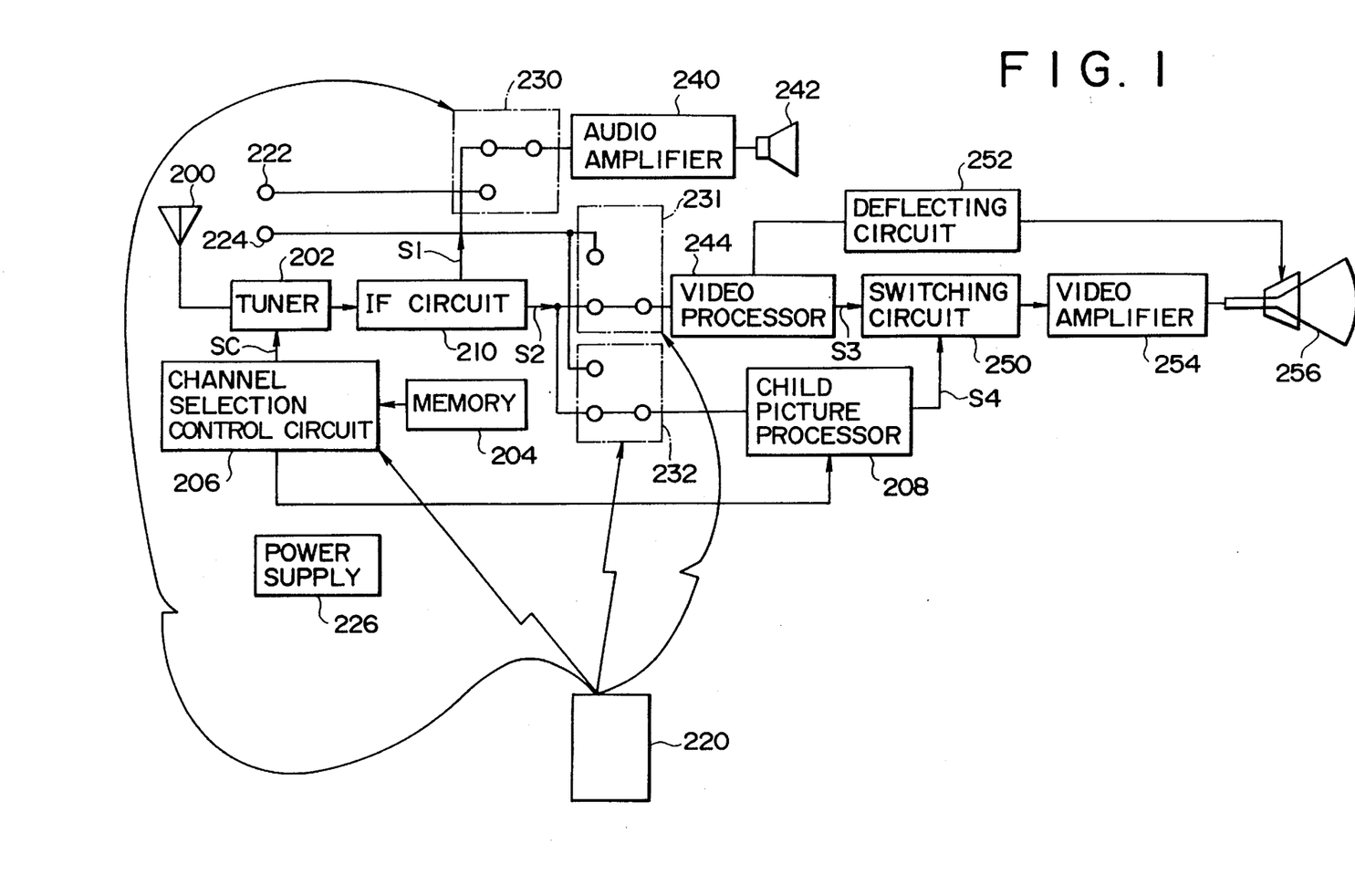
FIG. 1 is a block diagram of a preferred embodiment representing the television receiver of the present invention.

FIG. 1 is a block diagram of a first embodiment representing the television receiver of the present invention. To begin with, a description will be given on this block diagram.

An antenna 200 is connected to a tuner 202. A memory 204 is connected to a channel-selection control circuit 206, to which the tuner 202 is connected.

The channel-selection control circuit 206 is connected to a child picture processor 208, and an IF (intermediate frequency) circuit 210 is connected to the rear stage of the tuner 202.

The frequencies of video and audio waves received at the antenna 200 are converted in the tuner 202.

In the IF circuit 210, there are performed video IF amplification and audio IF amplification with respect to the video signal and the audio signal obtained from the tuner 202, whereby an audio signal S1 and a video signal S2 are outputted.

When an unshown button in a television receiver body or a numeral button in an undermentioned remote control unit 220 is depressed, a control signal SC is supplied from the channel-selection control circuit 206 to the tuner 202 to thereby select a desired channel (broadcasting station). The frequencies of a multiplicity of broadcasting stations are previously stored in the memory 204.

External input terminals 222 and 224 are provided for receiving input signals from an external video apparatus or the like. Denoted by 226 is a power supply.

Changeover switches 230, 231, 232 are formed in the following manner.

The switch 230 is used for selecting either the audio signal S1 obtained from the IF circuit 210 or an external input (e.g., audio signal included in the video input) from the external input terminal 222 and feeding the selected signal to an audio amplifier 240. The audio signal amplified therein is then supplied to a loudspeaker 242.

Meanwhile the switch 231 is used for selecting either the video signal S2 obtained from the IF circuit 210 or a video input signal or the like from the external input terminal 224 and feeding the selected signal to a video processor 244.

And another switch 232 is used for selecting either the video signal S2 obtained from the IF circuit 210 or a video signal or the like from the external input terminal 224 and feeding the selected signal to a child picture processor 208.

Figure 3:
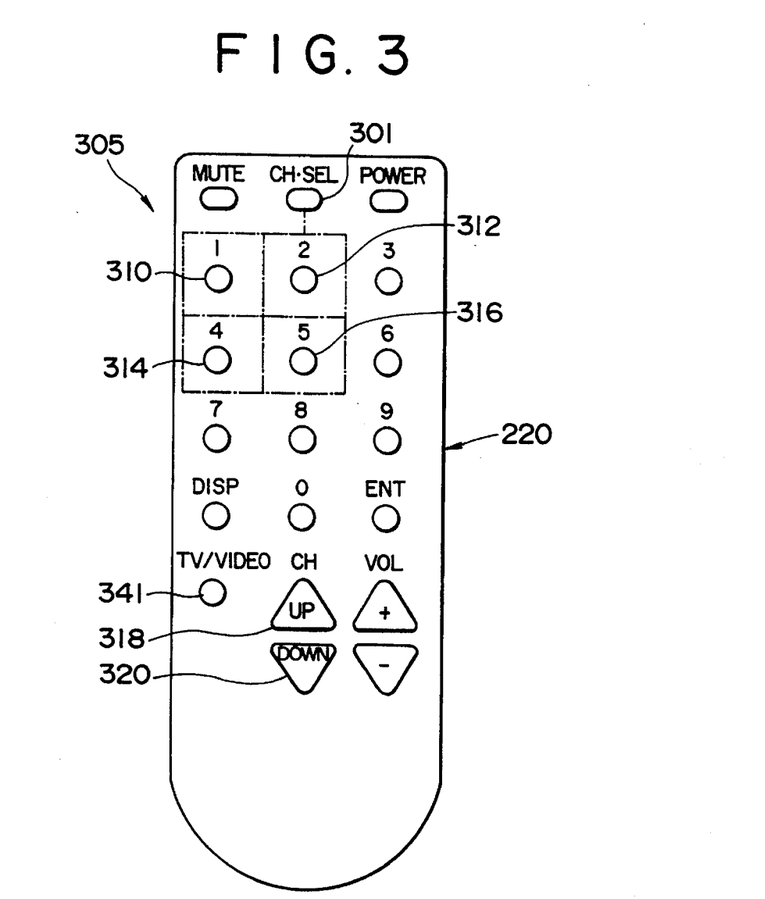
FIG. 3 shows a remote control unit as a channel selector conforming with the segmental child picture screens of FIG. 2.

The switches 230, 231 and 232 can be selectively actuated by depressing a TV/VIDEO button 341 provided in the remote control unit 220 as a channel selector shown in FIG. 3.

The video processor 244 is connected to a switching circuit 250 and a deflecting circuit 252. And the child picture processor 208 is connected to the switching circuit 250. In this circuit configuration, the processed video signal S3 outputted from the video processor 244 and the child picture signal S4 are fed selectively or simultaneously to a video amplifier 254 via the switching circuit 250, and the image is visually represented on a display tube 256 such as a cathode-ray tube.

Now the method for selection of a channel (broadcasting station) in this embodiment will be described below with reference to FIGS. 1 through 3.

First, required broadcasting stations are selectively registered by depressing numeral buttons 310, 312, 314 and 316 disposed in the remote control unit 220. It is also possible to register broadcasting stations by depressing automatic register buttons in the television receiver body or those in the remote control unit 220.

This procedure automatically registers the broadcasting stations, of which signal strengths are greater than a predetermined value, out of the entire stations selected sequentially in the order from the station of the lowest channel number. Thereafter unrequited stations are erased. Such registration of the stations are executed on the basis of the frequencies stored previously in the memory 204 employed in the apparatus of FIG. 1.

In this embodiment, selection of broadcasting stations is performed by the above method with the child picture display function shown in FIG. 1. The child picture display function can be achieved by the channel selection control circuit 206, the child picture processor 208 and the switching circuit 250. When a telecast is being displayed on a parent picture screen 300 of FIG. 2 which will be described later, the child picture display function is utilized to display external input signals on four segmental child picture screens 302, 304, 306 and 308. On the other hand, when an external input signal is being displayed on the parent picture screen 300, telecasts can be displayed by the same function on the segmental child picture screens 302, 304, 306 and 308. The parent picture screen 300 is the whole of the display screen, and the segmental child picture screens are divided ones.

Now the constitution of the parent picture screen 300 of the video display tube 256 shown in FIG. 1 will be described below specifically with reference to FIG. 2.

Figure 2:
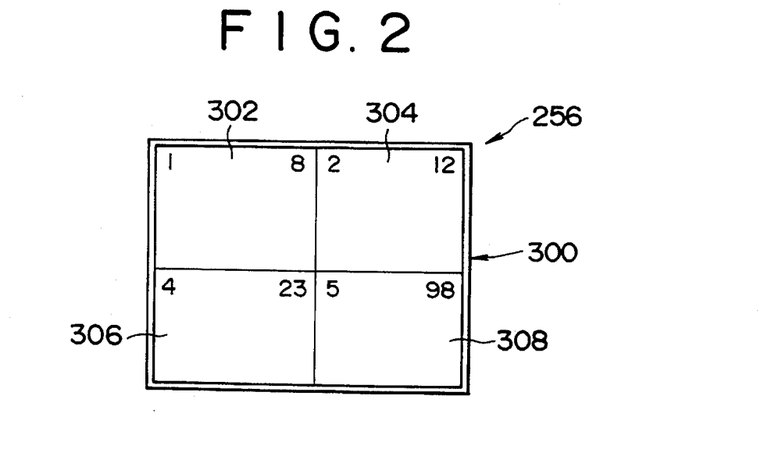
FIG. 2 shows an exemplary display tube of the invention with four segmental child picture screens.

First, when a CH.SEL (channel select) button 301 in the remote control unit 220 of FIG. 3 is depressed, the child picture signal S4 in FIG. 1 is inputted to the video amplifier 254, so that four segmental child pictures 302, 304, 306, 308 are displayed on the parent picture screen 300 of the video display tube 256 as shown in FIG. 2.

On the four segmental child screens 302, 304, 306 and 308, the broadcast contents of the stations previously registered are displayed as "still pictures" which are changed periodically at a predetermined time interval. This process results from the fact that a certain time is required for the channel selection and the operation of the child picture processor 208 in FIG. 1 inclusive of analog-to-digital conversion, writing in and reading out from the memory, and digital-to-analog conversion.

The broadcast contents are sequentially displayed, in the order from the stations being currently displayed to the stations of higher channel numbers, on the respective segmental child picture screens by repeated depression of the GH. SEL button 301. As illustrated in FIG. 2, the numerals (1, 2, 4, 5) displayed in the left upper portions of the segmental child picture screens 302, 304, 306, 308 correspond respectively to the numerals (1, 2, 4, 5) of numeral buttons 310, 312, 314, 316 which constitute an actuator 305 of the remote control unit 220 shown in FIG. 3. Meanwhile the numerals (8, 12, 23, 98) displayed in the upper right portions of the segmental child picture screens correspond respectively to the channel numbers of broadcasting stations. For example, the segmental child picture screen 304 corresponds to the numeral button 2 of the remote control unit 220, and the channel number thereof is 12. Due to such arrangement, it becomes possible to easily recognize the numeral buttons being depressed in the remote control unit 220 and also the channel numbers merely by watching the segmental child pictures.

If a CH.UP (channel up) button 318 is depressed in the display state mentioned above, the broadcasting stations being displayed on the individual child picture screens are sequentially changed to those of higher channel numbers. To the contrary, if a CH-DOWN (channel down) button 320 is depressed, the broadcasting stations being displayed on the child picture screens are sequentially changed to those of lower channel numbers. For example, on the segmental child picture screen 302, depression of the CH.UP button 318 sequentially changes the channel number from "8" to "10", "12" and so forth.

Selection of a desired broadcasting station out of the display contents on the four segmental child picture screens can be executed by depressing one numeral button of the remote control unit corresponding to the numeral in the upper left portion of the segmental child picture screen where the desired broadcasting station is being displayed. Then such segmental child picture screen is changed to the whole parent picture screen 300, so that the selected broadcasting station is displayed thereon.

Figure 4:
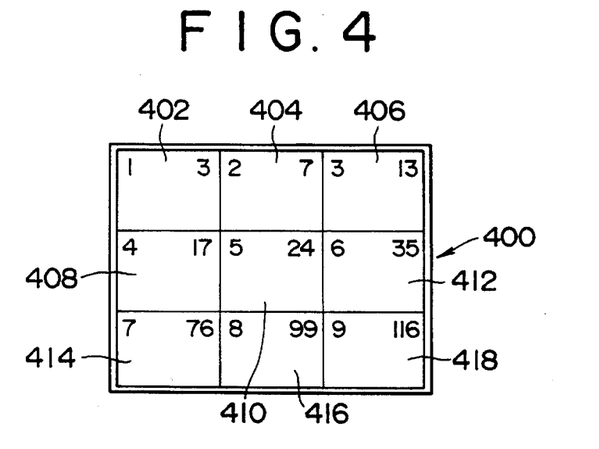
FIG. 4 shows another display tube of the invention with nine segmental child picture screens.

In FIG. 4, a parent picture screen 400 consists of nine segmental child picture screens 402, 404, 406, 408, 410, 412, 414, 416 and 418.

Figure 5:
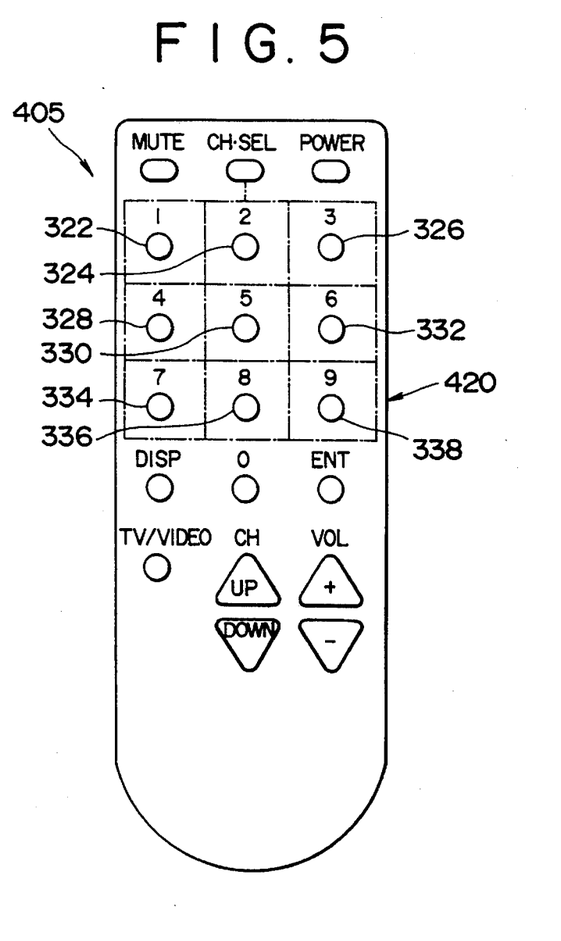
FIG. 5 shows another exemplary remote control unit as a channel selector conforming with the segmental child picture screens of FIG. 4.

And nine numeral buttons 322, 324, 326, 328, 330, 332, 334, 336 and 338 constituting an actuator 405 of a remote control unit 420 shown in FIG. 5 are provided correspondingly to such nine segmental child picture screens. For example, the segmental child picture screen 416 corresponds to the numeral button 336 in the remote control unit 320, and the channel number thereof is 99.

Figure 6:
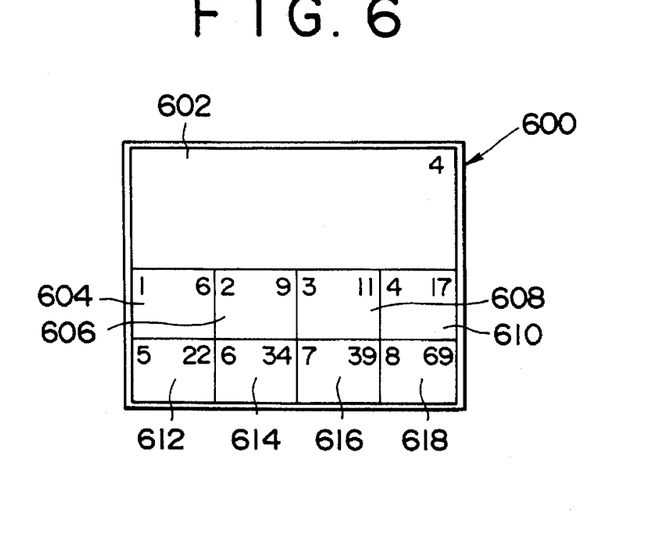
FIG. 6 shows a further display tube of the invention with eight segmental child picture screens and one main picture screen.

In FIG. 6, a parent picture screen 600 consists of nine segmental child picture screens 602, 604, 606, 608, 610, 612, 614, 616 and 618, in which one child picture screen 602 is greater than any of the other eight screens and is termed a main picture screen.

Figure 7:
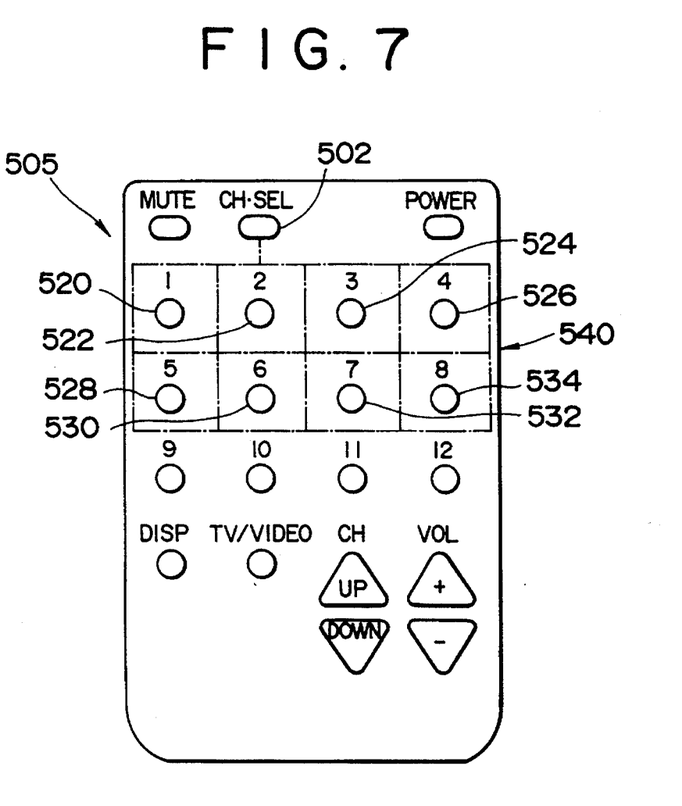
FIG. 7 shows a remote control unit as a channel selector conforming with eight segmental child picture screens.

The segmental child picture screens 604, 606, 608, 610, 612, 614, 616 and 618 correspond respectively to numeral buttons 520, 522, 524, 526, 528, 530, 532 and 534 constituting an actuator 505 of a remote control unit shown in FIG. 7.

Figure 8:
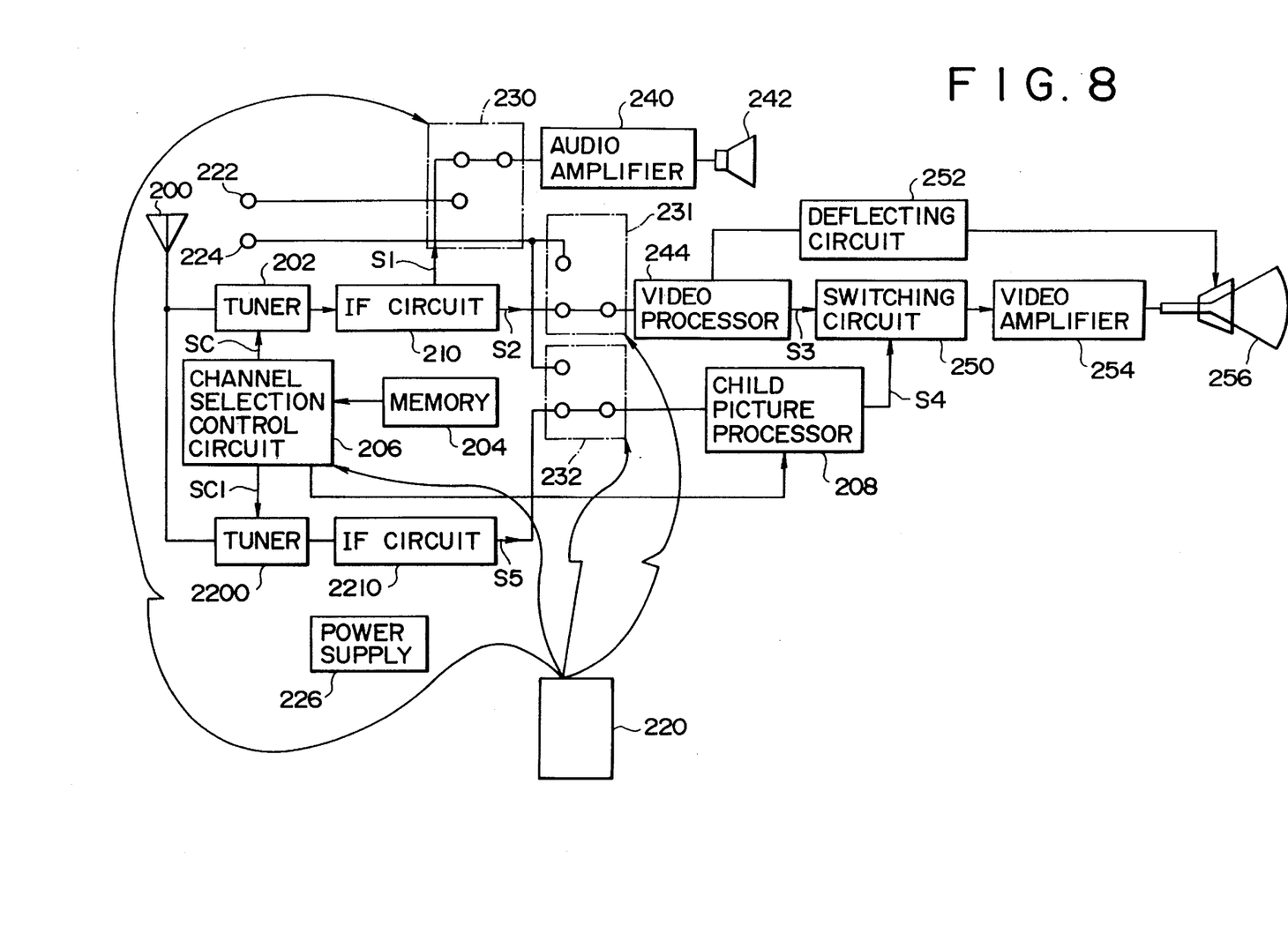
FIG. 8 is a block diagram of another preferred embodiment representing the television receiver of the present invention.

FIG. 8 is a block diagram of a second embodiment representing the television receiver of the present invention. In this block diagram, the same component elements as those employed in the aforementioned block diagram of FIG. 1 are denoted by the same reference numerals, and a repeated explanation thereof is omitted here.

In the constitution of FIG. 8, another set of a tuner 2200 and an IF circuit 2210 are additionally provided. More specifically, there are provided a total of two sets, i.e., a first set of a tuner 202 and an IF circuit 210, and a second set of a tuner 2200 and an IF circuit 2210.

Due to such constitution, it is possible, in the examples of FIGS. 6 and 7 where nine segmental child picture screens are prepared, to perform the aforementioned channel selection under the condition that at least one segmental child picture is displayed while a television picture prior to depression of, e.g., the CH.SEL button 502 is left as a moving picture on the main screen 600.

As described hereinabove, picture information of the previously stored broadcasting stations corresponding in number to the actuating buttons of the remote control unit can be sequentially displayed as child pictures on the segmental screens, and any desired broadcasting station is selectable by depressing one appropriate actuating button of the remote control unit corresponding to the position of the segmental child picture screen.

Thus, according to the present invention, it is possible to select any desired broadcasting station with instant confirmation of the broadcast contents of segmental child pictures by a simplified manipulation of the actuator, hence attaining an advantageous effect that enhances the operational facility remarkably in the channel selection.

What is claimed is:

1. An apparatus for displaying a plurality of pictures of registered broadcasting stations in response to input from a user, comprising:

a television receiver having a display screen and a channel selector for manipulation by said user of said apparatus, said channel selector including a remote controller having a plurality of actuating members and a single array of numeral buttons for channel selection, wherein selected stations of said registered broadcasting stations are divided into a plurality of predetermined groups of nonsequential channels such that a first group of said plurality of predetermined groups of nonsequential channels is displayed on segmental picture screens formed on said display screen in response to a first user input from a first actuating member of said plurality of actuating members, a next group of said plurality of predetermined groups of nonsequential channels is displayed on segmental picture screens formed on said display screen in response to a second user input from said first actuating member, and a sequential group of stations comprising each registered broadcasting station sequential to each registered broadcasting station of said first group of said plurality of predetermined groups of said registered broadcasting stations is displayed on segmental picture screens formed on said display screen in response to user input from a second actuating member of said plurality of actuating members, and wherein said single array of numeral buttons for channel selection also serve for selection of particular stations of said registered broadcasting stations comprising said plurality of predetermined groups of nonsequential channels and said sequential group, each button of said single array of numeral buttons being disposed at predetermined positions corresponding to those of said segmental picture screens, such that when a button of said single array of numeral buttons is manipulated a broadcasting station on a segmental picture screen at a position corresponding to said button is selected to fill said display screen.

2. A method for displaying a plurality of pictures of broadcasting stations in response to input from a user, comprising the steps of:

selecting a nonsequential plurality of said broadcasting stations;

registering said nonsequentional plurality of selected broadcasting stations in order from a station having a lowest channel number to a station having a highest channel number;

forming a plurality of segmented screens on a display screen of a television receiver;

displaying a first set of said nonsequential plurality of broadcasting stations on said segmented screens;

displaying a second set of said nonsequential plurality of broadcasting stations on said segmented screens in response to manipulation of an actuating member of a channel selector by a user, wherein said second set of nonsequential broadcasting stations comprises a set of said plurality of previously registered broadcasting stations sequential to said first set when said actuating member is a first actuating member, and said second set of nonsequential broadcasting stations comprises a set of broadcasting stations wherein each broadcasting station of said second set has a channel number sequential to a channel number of a corresponding broadcasting station of said first set when said actuating member is a second actuating member; and displaying a selected broadcasting station on an entire portion of said display screen wherein said selected broadcasting station is selected by a user manipulating a button from a single array of numeral buttons of said channel selector, said button being disposed at a predetermined position on said channel selector corresponding to a position of said segmented screen at which said selected broadcasting station is displayed.

* * * * *